United States Patent
Watase et al.

(10) Patent No.: US 6,927,243 B2
(45) Date of Patent: Aug. 9, 2005

(54) PHOTOSETTING RESIN COMPOSITION, METAL LAMINATES HAVING LAYERS MADE FROM THE COMPOSITION, METAL MEMBERS MADE FROM THE LAMINATES AND HAVING HIGH-HARDNESS PROTECTING LAYERS AND PROCESS FOR PRODUCTION THEREOF

(75) Inventors: Takeshi Watase, Hyogo (JP); Yasuo Hirano, Hyogo (JP); Kazuo Okumura, Hyogo (JP); Atsushi Kihara, Hyogo (JP); Yukihisa Komiya, Hyogo (JP); Tadashige Nakamoto, Hyogo (JP); Takahiro Kobayashi, Hyogo (JP); Takeshi Ohwaki, Hyogo (JP); Mika Nishida, Hyogo (JP); Etsuji Ueno, Hyogo (JP)

(73) Assignee: Kobe Steel, Ltd., Kobe (JP)

( * ) Notice: Subject to any disclaimer, the term of this patent is extended or adjusted under 35 U.S.C. 154(b) by 103 days.

(21) Appl. No.: 10/221,672
(22) PCT Filed: Jan. 22, 2002
(86) PCT No.: PCT/JP02/00431
§ 371 (c)(1),
(2), (4) Date: Sep. 16, 2002
(87) PCT Pub. No.: WO02/057373
PCT Pub. Date: Jul. 25, 2002

(65) Prior Publication Data
US 2003/0099841 A1 May 29, 2003

(30) Foreign Application Priority Data
Jan. 22, 2001 (JP) .......................... 2001-13084

(51) Int. Cl.$^7$ .............................. C08K 3/40; C08F 2/46; C09D 4/02
(52) U.S. Cl. ........................... 522/96; 522/99; 522/103; 522/107; 522/83; 522/81; 522/114; 522/121
(58) Field of Search ............................... 522/83, 91, 96, 522/148, 99, 81, 103, 107, 114, 121; 528/26, 65

(56) References Cited

U.S. PATENT DOCUMENTS

| | | | | |
|---|---|---|---|---|
| 4,227,979 A | * | 10/1980 | Humke et al. | 522/14 |
| 4,533,455 A | * | 8/1985 | Balko et al. | 204/279 |
| 4,778,719 A | * | 10/1988 | Jagannathan | 428/323 |
| 5,449,702 A | * | 9/1995 | Tayama et al. | 522/4 |
| 5,536,426 A | * | 7/1996 | Sasaki et al. | 252/73 |

FOREIGN PATENT DOCUMENTS

| | | | |
|---|---|---|---|
| JP | 5-298935 | | 11/1993 |
| JP | 6-223636 | | 8/1994 |
| JP | 11-43596 | | 2/1999 |
| WO | WO 97/38236 | * | 10/1997 |

OTHER PUBLICATIONS

Machine translation of JP 11043596 A, Feb. 1999, Japanese Patent Office website.*
Abstract, JP 2001013678 A, Jan. 2001.*
Abstract, JP 2004051749 A, Feb. 2004.*

* cited by examiner

Primary Examiner—Susan Berman
(74) Attorney, Agent, or Firm—Oblon, Spivak, McClelland, Maier & Neustadt, P.C.

(57) ABSTRACT

The present invention relates to a photocurable resin composition which contains a photocurable component and forms on a substrate a photocurable resin layer having a viscosity of 1000–500,000 Pa·s at 23° C. and 65% RH. This resin composition is formed into a photocurable resin layer, which is laminated onto a metal sheet to give a metal sheet with a photocurable resin layer laminated thereon. This metal sheet can be worked and converted into a metal part with a high-hardness protective coating laminated thereon upon irradiation with light or electron beams after working.

8 Claims, No Drawings

PHOTOSETTING RESIN COMPOSITION, METAL LAMINATES HAVING LAYERS MADE FROM THE COMPOSITION, METAL MEMBERS MADE FROM THE LAMINATES AND HAVING HIGH-HARDNESS PROTECTING LAYERS AND PROCESS FOR PRODUCTION THEREOF

TECHNICAL FIELD

The present invention relates to a photocurable resin composition, a metal sheet with a photocurable resin layer laminated thereon, a metal part with a high-hardness protective coating laminated thereon, and a process for production thereof.

BACKGROUND ART

Metal sheets find use in various areas including electric appliances, OA machines, automobiles, and building materials. They are usually coated with paint after working into a desired form.

A new practice has recently developed to use prepainted metal sheets for such applications. Precoated metal sheets obviate the necessity of coating by those who work metal sheets. This in turn obviates the necessity of solvent disposal and hence greatly contributes to environmental protection and cost reduction.

Unfortunately, precoated metal sheets are not necessarily satisfactory in scratch resistance and film hardness because the paint used for them is so designed as to have an adequate degree of softness so that the coating film does not crack at the time of working. This weakness restricts their, application areas and deteriorates their finished products due to scratches made at the time of working.

One way to avoid scratches at the time of working is to stick a protective film (consisting of a plastic film and acrylic-based adhesive applied thereto) to the surface of a metal sheet before working and peel it off after working. However, precoated metal sheets still need improvement in film hardness and scratch resistance.

The present invention was completed in view of the foregoing. It is an object of the present invention to provide a photocurable resin composition suitable for production of precoated metal sheets with hard top coating capable of working into metal parts without scratches.

DISCLOSURE OF THE INVENTION

The present invention is directed to a photocurable resin composition which contains a photocurable (photo-polymerizable) resin and forms a photocurable resin layer having a viscosity of 1000–500,000 Pa·s at 23° C. and 65% RH.

The present invention is directed also to a metal sheet with a photocurable resin layer laminated thereon which is obtained by coating a metal sheet with said photocurable resin composition. The laminated metal sheet permits free working because the photocurable resin layer before photo-curing is viscoelastic and formable into a desired shape. In addition, upon irradiation with light after working, the photocurable resin layer cures three-dimensionally to form a hard protective film with good properties. The metal sheet with the photocurable resin layer laminated thereon can be made into desired metal parts simply by irradiation with light for a short time that follows working. This leads to good working properties and cost reduction.

The present invention is directed also to a metal part with high-hardness protective coating laminated thereon, which is obtained by working said metal sheet with a photocurable resin layer laminated thereon and subsequently curing said photocurable resin layer.

The present invention is directed also to a process for production of said metal part with high-hardness protective coating laminated thereon. This process consists of working said metal sheet with a photocurable resin layer laminated thereon and subsequently curing said photocurable resin layer.

BEST MODE FOR CARRYING OUT THE INVENTION

According to the present invention, the photocurable resin composition is one which forms on a substrate (such as metal sheet) a photocurable resin layer having a specific value of viscosity.

According to the present invention, the metal sheet with a photocurable resin layer laminated thereon is one which is composed of a metal sheet and said photocurable resin layer (having a specific value of viscosity) laminated thereon. It is desirable to cover the photocurable resin layer with a protective film in order to prevent the photocurable resin layer from sticking to the working machine (such as press) and to protect the photocurable resin layer from the inhibitory action by oxygen on polymerization that would occur when the photocurable resin layer is cured.

The photocurable resin layer may be formed on one side or both sides of a metal sheet. An interlayer to improve corrosion resistance may be placed between the photocurable resin layer and the metal sheet according to need. It includes any known film formed by chemical treatment or plating and any known resin coating film. The photocurable resin layer should desirably constitute the outermost layer on the metal part because it forms a very hard protective film after curing. In other words, it is desirable that no additional layer, except for a protective film, be formed on the photocurable resin layer. Incidentally, the term "metal sheet" means a flat metal sheet which is not yet worked, and the term "metal part" means a metal sheet which has been worked.

Examples of the metal sheet include galvanized steel sheets, aluminum sheets, aluminum alloy sheets, and titanium sheets. Chromating or phosphating on the metal sheet or plating, which precedes lamination with the photocurable resin layer, effectively improves corrosion resistance and adhesion. (Incidentally, chromating may be accomplished in any way, such as reaction, coating, and electrolysis.) In addition, lamination with the photocurable resin layer may be preceded by coating with a colored or uncolored resin for improvement in design and corrosion resistance. Such coating film may be formed from any known paint used for precoated metal sheets.

The photocurable resin layer formed on a metal sheet should have an adequate degree of hardness so that it will not be forced out of the edge of the metal sheet or permanently depressed during working or storage.

Moreover, the photocurable resin layer should have an adequate degree of softness and flexibility so that it will be deformed without cracking or peeling from the metal sheet while working (e.g., bending) is proceeding.

Furthermore, the photocurable resin layer should have an adequate degree of adhesiveness so that it prevents the protective film from being lifted when the protective film slips out of place at the time of working. If the protective film slips out of place and peels off the photocurable resin layer, the photocurable resin layer will be exposed to oxygen which inhibits polymerization at the time of curing.

For the photocurable resin layer to have adequate hardness, softness, and adhesiveness and to have capability of forming high-hardness film upon curing, it should have a viscosity ranging from 1000 to 500,000 Pa·s at 23° C. and 65% RH. With a viscosity under the lower limit, the photocurable resin layer will be forced out of the edge of the metal sheet or permanently depressed by a die at the time of bending. The lower limit of the viscosity should preferably be 5000 Pa·s. By contrast, with a viscosity above the upper limit, the photocurable resin layer will experience the above-mentioned troubles because of insufficient softness and adhesiveness. The upper limit of the viscosity should preferably be 100,000 Pa·s.

The term "viscosity" as used in the present invention denotes the viscosity of the photocurable resin layer per se formed on a metal sheet. The viscosity of the photocurable resin layer is a value measured with Rheometrics Dynamic Analyzer (made by Rheometric Inc.) at 23° C. and 65% RH, with the angular deformation velocity being 100 rad/s.

The photocurable resin layer may be formed by coating a metal sheet with a photocurable resin composition containing a photocurable resin. (The metal sheet may have a coating film previously formed thereon according to need.) Alternatively, the photocurable resin layer may be formed on a metal sheet by lamination with a transferable film which has previously been formed on a base film.

The photocurable component as a major constituent of the photocurable resin composition is not specifically restricted so long as the resulting photocurable resin layer has a viscosity specified above. It includes any known resin which cures through photo-cationic polymerization or photo-radical polymerization. Prepolymers (oligomers) or monomers having (meth)acryloyl groups are desirable because they easily undergo radical polymerization by light.

Examples of the prepolymers having (meth)acryloyl groups include epoxy (meth)acrylate, urethane (meth) acrylate, polyester (meth)acrylate, alkyd resin (meth) acrylate, and silicone resin (meth)acrylate. They are obtained by reacting any of epoxy resin, urethane resin, polyester resin, alkyd resin, and silicone resin with a polyfunctional (meth)acrylate. The epoxy resin may be of bisphenol type or novolak type. Of the above-mentioned examples, urethane (meth)acrylate is particularly desirable because it readily meets the requirement for viscosity and it forms high-hardness film. This urethane (meth)acrylate is commercially available from Shin-Nakamura Kagaku Kogyo Co., Ltd. under a trade name of "NK Oligo UA".

The photocurable component may be a mixture of the above-mentioned prepolymer and a photocurable polyfunctional monomer. The latter properly adjusts the viscosity of the photocurable resin layer and functions as a cross-linking agent to improve the hardness and chemical resistance of the protective film after curing. A combination of the photocurable prepolymer and polyfunctional monomer is useful as the photocurable component.

The polyfunctional monomer should preferably be a polyfunctional (meth)acrylate having two or more (meth) acryloyl groups in one molecule. Its typical examples are listed below.

Di(meth)acrylate such as 1,6-hexanediol di(meth)acrylate, 1,3-butanediol di(meth)acrylate, 1,4-butanediol di(meth) acrylate, diethylene glycol di(meth)acrylate, triethylene glycol di(meth)acrylate, polyethylene glycol di(meth) acrylate, tripropylene glycol di(meth)acrylate, trimethylol propane di(meth)acrylate, and ethoxylated bisphenyl-A di(meth)acrylate.

Tri(meth)acrylate such as trimethylol propane tri(meth) acrylate, ethoxylated trimethylol propane tri(meth) acrylate, Propoxylated trimethylol propane tri(meth) acrylate, tris(2-hydroxyethyl) isocyanurate tri(meth) acrylate, and pentaerythritol tri(meth)acrylate.

Four-functional or polyfunctional (meth)acrylate such as pentaerythritol tetra(meth)acrylate, ditrimethylol propane tetra(meth)acrylate, ethoxylated pentaerythritol tetra (meth)acrylate, dipentaerythritol hydroxy penta(meth) acrylate, and dipentaerythritol hexa(meth)acrylate. Additional examples are polyfunctional (meth)acrylate commercially available from Nippon Kayaku Co., Ltd. under a trade name of "Kayarad".

The above-mentioned polyfunctional monomers may be used in combination with a small amount of monofunctional monomers for adjustment of viscosity and hardness. The effect of a monofunctional monomer is preventing the cured film from becoming brittle due to excessively high crosslinking density. Examples of such monofunctional monomers include 2-(2-ethoxyethoxy) ethylacrylate, stearyl (meth)acrylate, tetrahydrofuryl (meth)acrylate, dicyclopentadiehyl (meth)acrylate, lauryl (meth)acrylate, cyclohexyl (meth)acrylate, 2-phenoxyethyl (meth)acrylate, isodecyl (meth)acrylate, isooctyl (meth)acrylate, isobornyl (meth) acrylate, 2-hydroxyethyl (meth)acrylate, 2-hydroxypropyl (meth)acrylate, tridecyl (meth)acrylate, caprolactone (meth) acrylate, and ethoxylated nonylphenol (meth)acrylate. Such monomers as (meth)acrylamide and styrene may also be used in small amounts.

The photocurable component should contain photopolymerizable double bonds in such an amount that the equivalent weight is 145 to 210, so that it meets the above-mentioned requirement for viscosity and forms a cured film which has high hardness but is not brittle. The equivalent weight of double bonds is a quotient of the molecular weight of the photocurable prepolymer and/or monomer (as the photocurable component) divided by the number of double bonds contained in one molecule of the photocurable component. In the case where the photocurable component is a mixture of two or more photocurable compounds, the equivalent weight of double bonds denotes an average calculated from mass fraction of individual photocurable compounds. For example, if the photocurable component is composed of three kinds of photocurable compounds A (50 mass %), B (40 mass %), and C (10 mass %), each having the equivalent weight of double bonds of X, Y, and Z, respectively, then the equivalent weight of double bonds of this photocurable component is calculated as $50 \cdot X/100 + 40 \cdot Y/100 + 10 \cdot Z/100$.

The photocurable component with an equivalent weight of double bonds smaller than 145 will give a brittle film after curing. The photocurable component with an equivalent weight of double bonds larger than 210 will give a photocurable resin layer which does not meet the requirement for viscosity. The more desirable lower limit and upper limit of the equivalent weight of double bonds is 155 and 200, respectively.

According to the present invention, the photocurable resin layer should contain a photocurable component but need not be composed entirely of a photocurable component. The reason for this is that although the more is the content of the photocurable component, the higher is the hardness of the film after curing, there is an instance where it is desirable to add a modified silicone resin and other organic resins and organic additives for improvement of film properties (as mentioned later). An approximate content of the photocurable component is 50 mass % or more, assuming that organic compounds constituting the photocurable resin layer account for 100 mass %. If the content of the photocurable component is less than 50 mass %, the resulting photocurable resin layer has insufficient adhesiveness before curing and hence causes the protective film to peel off at the time of working. This results in a cured film which has a poor appearance and insufficient hardness due to incomplete curing reaction. The content of the photocurable component should desirably be 70 mass % and up, more desirably 75 mass % and up.

One way to form the photocurable resin layer on the surface of a metal sheet is to coat a metal sheet with a photocurable resin composition containing a photocurable component. An alternative way is to coat a base film with a photocurable resin composition and transfer the coating film to a metal sheet from the base film.

The photocurable resin composition should preferably be incorporated with a photopolymerization initiator, which is a compound that evolves radicals upon light absorption in the case where the photocurable component is a prepolymer and/or monomer containing (meth)acryloyl groups. Typical examples of such compounds are given below. Benzophenones such as benzophenone, 4-(1-t-butyldioxy-1-methylethyl)benzophenone, and 3,3',4,4'-tetrakis(t-butyldioxycarbonyl) benzophenone; methyl benzoylbenzoate; benzoins such as benzoin and benzoin alkyl ether; ketals such as acetophenone dimethyl ketal and benzyl dimethyl ketal. Acetophenones such as acetophenone and trichloroacetophenone; thioxanthones such as 2,4-dimethylthioxanthone. Anthraquinones such as 2-methylanthraquinone; and dibenzosuberones.

In addition, several photopolymerization initiators are commercially available from Ciba Specialty Chemicals Inc. under a trade name of "Irgacure" series.

The photopolymerization initiator mentioned above may be used in an amount of 0.1–20 parts by mass for 100 parts by mass of the above-mentioned photocurable component. If the amount of the photopolymerization initiator is insufficient, polymerization needs extended irradiation with light or polymerization hardly occurs upon irradiation with light. The resulting protective film is poor in hardness. The photopolymerization initiator will not produce any additional effect even though it is used in an amount more than 20 parts by mass.

The photocurable resin composition may be incorporated with an organic solvent so that it can be easily applied to a metal sheet. The solvent is not specifically restricted so long as it dissolves constituents (such as photocurable component).

In the case where the metal part with a high-hardness protective coating laminated thereon (which has been obtained after curing) is applied to the external member of domestic electric appliances which needs stain resistance, it is desirable to incorporate the photocurable resin composition with an alkyd-modified silicone resin or acrylic-modified silicone resin. These modified silicone resins are recommended in the present invention because it was found that they are better in compatibility with photocurable components, more readily react with photocurable components, and exhibit better stain resistance without deteriorating the hardness of the cured film, as compared with epoxy-, polyester-, and urethane-modified silicone resins.

The alkyd-modified silicone resin (silicone alkyd) is represented by the formula below, in which R, R', and R" each denote an organic group.

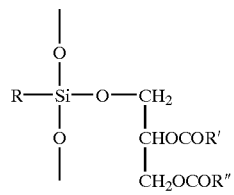

The alkyd-modified silicone resin (in the form of silicone alkyl varnish which is a reaction product of silicone varnish and alkyd) is commercially available from GE Toshiba Silicone Co., Ltd. under a trade name of "TSR180".

The acrylic-modified silicone resin is represented by the formula below, in which R and R' each denote an organic group.

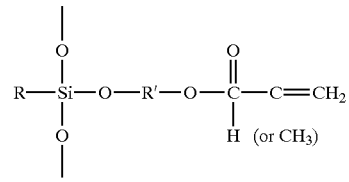

The acrylic-modified silicone resin (in the form of silicone acrylic varnish which is a reaction product of silicone varnish and a (meth)acryloyl group-containing compound) is commercially available from GE Toshiba Silicone Co., Ltd. under a trade name of "TSR171".

The alkyd-modified silicone resin and acrylic-modified silicone resin should be added in an amount of 2–20 parts by mass (as solids) for 100 parts by mass of the photocurable component. When the photocurable resin composition is prepared, it is necessary to weigh the modified silicone varnish in terms of solids.

For the high-hardness protective coating (which is obtained by curing the photocurable resin layer) to have sufficient hardness, it is desirable to incorporate the photocurable resin composition with a filler. This filler should preferably be one which has an anisotropic shape. Spherical fillers are not desirable because they do not produce the filling effect. The most desirable example of the shape-anisotropic filler is glass fiber or thin filmy glass. Because of their high transparency; they do not interfere with photocuring reaction; in addition, they effectively increase the surface hardness of the cured coating.

The glass fiber should preferably be one which has a fiber diameter of 5–20 μm and an aspect ratio of 2–10. The thin filmy glass should preferably be one which has an average thickness smaller than 10 μm and an average grain size smaller than 50 μm. These glass fillers should preferably be surface-treated with any known silane coupling agent which improves affinity for the photocurable resin. These glass-based fillers may be used alone or in combination with one another. The content of the filler should preferably be 5–50 mass % of the solids (100 mass %) in the photocurable resin composition. With a content less than 5 mass %, the filler does not produce its effect. With a content more than 50 mass %, the filler impairs the mixing and application properties and imparts a higher viscosity than specified above to the photocurable resin layer.

If necessary, the photocurable resin composition may be incorporated with acrylic resin and other resins; extender such as calcium carbonate and titanium dioxide; reinforcing fiber; coloring pigment; and any known organic additives such as coupling agent, leveling agent, sensitizer, thickener, antioxidant, UV light absorber, UV light stabilizer, flame retardant, and thermal polymerization inhibitor. Incidentally, a pigment to shield UV light should be used sparingly because it might cause the photocurable resin layer with a large thickness to fluctuate in the degree of curing.

The photocurable resin composition is applied to one side or both sides of a metal sheet by any known coating method, such as dipping, roller coating, spraying, and curtain flow coating. In this way there is obtained a metal sheet laminated with a photocurable resin layer (which is not yet cured). In the case where the photocurable resin composition contains a solvent, the photocurable resin layer should be dried by heating after coating so that the solvent is evaporated rapidly. An alternative to coating is laminating on a metal sheet the photocurable resin composition which has been applied to a protective film or transfer film.

The thickness of the photocurable resin layer may vary depending on the use of the finished metal part; it is usually about 2 to 200 μm. If thinner than 2 μm, the photocurable resin layer may cause the protective film to peel off during working or may prevent the protective film from fully producing its effect after curing. If thicker than 200 μm, the photocurable resin layer excessively shrinks at the time of photocuring, deteriorating adhesion to the metal sheet, and lacks hardness for use as a protective coating. The lower limit of the thickness should preferably be 5 μm, more preferably 10 μm. The upper limit of the thickness should preferably be 150 μm, more preferably 100 μm. In the case where the above-mentioned glass-based filler is added, an adequate thickness should be established by taking into account the size and length of the filler, although it is not always restricted by them.

The photocurable resin layer has a certain degree of tackiness before curing and hence it might partly adhere to the die during working. Therefore, it is desirable to cover its surface with a protective film after the photocurable resin layer has been formed. The protective film may be formed from any material without specific restrictions so long as it peels off rapidly and completely from the surface of the cured film after the photocurable resin layer has been photocured. A desirable material for the protective film is polyethylene terephthalate because of its high transparency, strength, and resistance to dent by the die.

The thickness of the protective film should preferably be 25 to 100 μm. With a thickness smaller than 25 μm, the protective film is poor in dent resistance. With a thickness larger than 100 μm, the protective film swells at a bend during working because it is stiff and resilient. Swelling makes the protective film look poor. In addition, the swollen part of the protective film absorbs oxygen which interferes with the photocuring reaction, resulting in insufficient hardness.

The metal part with a high-hardness protective coating laminated thereon, which pertains to the present invention, is obtained by working the metal sheet with a photocurable resin layer laminated thereon and then irradiating it with light or electron beams, thereby curing the photocurable resin layer. Working method is not specifically restricted; it includes bending, pressing, etc. which may be adequately selected. The metal sheet with a photocurable resin layer laminated thereon, which pertains to the present invention, may be worked in any way.

After working, the photocurable resin layer is polymerized and cured. The photocuring reaction may be accomplished efficiently by irradiation with UV light (50–500 mJ/cm$^2$ from a high-pressure mercury lamp or an ultra-high-pressure mercury lamp) for about 0.5–1 minute. Sunlight or electron beams may also be used.

The invention will be described in more detail with reference to the following examples which are not intended to restrict the scope of the invention. Various changes and modifications may be made in the invention without departing from the spirit and scope thereof. In the following example, "parts" and "%" mean "parts by mass" and "mass %", respectively, unless otherwise stated.

EXAMPLES 1 TO 11

A metal sheet used as a substrate is a precoated steel sheet consisting of an electrogalvanized steel sheet (0.6 mm thick, with 20 g/m$^2$ of zinc), a chromate film (15 mg/m$^2$ of chromium), a primer layer of epoxy-modified polyester (10 μm thick after drying), and a polyester top coating layer (20 μm thick after drying).

A photocurable resin composition which is composed of components shown in Table 1 was prepared. It was applied onto the top coating on the above-mentioned precoated steel sheet to form a photocurable resin layer (20 μm thick) thereon. Thus, there was obtained a metal sheet with a photocurable resin layer laminated thereon. The surface of the photocurable resin layer was covered with a protective film, which is a 50-μm thick polyethylene terephthalate film.

Components shown in Table 1 are explained in the following.

Urethane acrylate "NK Oligo UA-32P" is a photocurable component having a weight-average molecular weight of 1560 and nine polymerizable double bonds, made by Shin-Nakamura Kagaku Kogyo Co., Ltd.

Urethane acrylate "NK Oligo U-6PHA" is a photocurable component having a weight-average molecular weight of 1308 and six polymerizable double bonds, made by Shin-Nakamura Kagaku Kogyo Co., Ltd.

Polyfunctional acrylate "Kayarad DPHA" is a photocurable component which is a 1:1 (by mass) mixture of five-functional acrylate having a molecular weight of 524 and a six-functional acrylate having a molecular weight of 547, made by Nippon Kayaku Co., Ltd. The equivalent weight of double bonds was calculated from the mixing ratio, as shown in Tables 1 and 2.

"Irgacure" as a photopolymerization initiator is 1-hydroxy-cyclohexylphenylketone, from Ciba Specialty Chemicals Inc.

PMMA is a homopolymer of methyl methacrylate which is not photopolymerizable. It is used for viscosity adjustment.

The viscosity of the photocurable resin layer was measured with Rheometrics Dynamic Analyzer (made by Rheometric Inc.) at 23° C. and 65% RH, with the angular deformation velocity being 100 rad/s.

The thus obtained metal sheet with a photocurable resin layer laminated thereon (together with the protective coating) was bent twice (with a back gauge of 12 mm) into a C-shaped section steel by using a bending machine "Be·GeN BG-20H" made by CGK Co., Ltd. The resulting product was irradiated with UV light (336.0 mJ/cm$^2$) emitted from a UV light lamp (120 W/cm, H-bulb) made by Fusion Inc.

To evaluate working properties, each product obtained in this manner was rated immediately after working, some time after working, and after photocuring, according to the following criteria. The results are shown in Table 2.

(1) Immediately after Working:

The sample was checked to see if the photocurable resin swelled from the edges of the metal sheet and protective coating.

○ . . . nothing anomalous

Δ . . . slight resin swelling x . . . remarkable resin swelling (2) Some Time after Working:

The sample was checked to see if the protective coating lifted.

◎ . . . nothing anomalous

○ . . . slight lifting occurred within 10 minutes

Δ . . . lifting occurred within 10 minutes x . . . lifting occurred within 1 minute (3) After Photocuring:

The sample was checked for the appearance of the cured film.

◎ . . . nothing anomalous

○ . . . slight denting was noticed

Δ . . . remarkable denting was noticed x . . . cured film was entirely anomalous The cured film was tested for pencil hardness according to JIS K5400. The results are shown in Table 2.

TABLE 1

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Urethane acrylate (NK Oligo UA-32P) (parts) | 0 | 50 | 60 | 75 | 80 | 85 | 90 | 100 | 100 | 100 | 0 |
| Urethane acrylate (NK oligo U-6PHA) (parts) | 0 | 0 | 0 | 0 | 0 | 0 | 0 | 0 | 0 | 0 | 100 |
| Polyfunctional acrylate (Kayarad DPHA) (parts) | 100 | 50 | 40 | 25 | 20 | 15 | 10 | 0 | 0 | 0 | 0 |
| Photopolymerization initiator (Irgacure 184) (parts) | 2.5 | 2.5 | 2.5 | 2.5 | 2.5 | 2.5 | 2.5 | 2.5 | 2.5 | 2.5 | 2.5 |
| PMMA (parts) | 0 | 0 | 0 | 0 | 0 | 0 | 0 | 0 | 20 | 20 | 0 |
| Viscosity (Pa · s) | 20 | 110 | 350 | 1,050 | 6,800 | 18,000 | 65,000 | 88,000 | 500,000 | 1,500,000 | 82,000 |
| Equivalent weight of double bonds | 97 | 135 | 143 | 154 | 158 | 162 | 165 | 173 | 173 | 173 | 218 |

TABLE 2

| Example | Viscosity Pa · s | Equivalent weight of double bonds | Working properties | | | Pencil hardness |
|---|---|---|---|---|---|---|
| | | | Immediately after working | Some time after working | After photo-curing | |
| 1 | 20 | 97 | X | X | X | — |
| 2 | 110 | 135 | Δ | Δ | X | — |
| 3 | 350 | 143 | ○ | ○ | Δ | — |
| 4 | 1,050 | 154 | ○ | ⊙ | ○ | 2 H |
| 5 | 6,800 | 158 | ○ | ⊙ | ⊙ | 2 H |
| 6 | 18,000 | 162 | ○ | ⊙ | ⊙ | 2 H |
| 7 | 65,000 | 165 | ○ | ⊙ | ⊙ | 2 H |
| 8 | 88,000 | 173 | ○ | ⊙ | ⊙ | 2 H |
| 9 | 500,000 | 173 | ○ | ⊙ | ○ | 2 H |
| 10 | 1,500,000 | 173 | ○ | X | Δ | 2 H |
| 11 | 82,000 | 218 | ○ | ⊙ | ⊙ | F~H |

The samples in Examples 1 to 3 were poor in working properties because their viscosity is lower than specified in the present invention. They were not tested for pencil hardness. The samples in Examples 4 to 9 were good in working properties because their viscosity is within the range specified in the present invention. They exhibited sufficient hardness after curing. The sample in Example 10 was poor in adhesiveness because its viscosity is higher than specified in the present invention. This poor adhesiveness causes the protective film to lift after working. The sample in Example 11 has a viscosity within the range specified in the present invention but has an equivalent weight of double bonds outside the range specified in the present invention. Therefore, it is good in working properties but slightly poor in hardness.

EXAMPLES 12 TO 16

These examples demonstrate how the amount of the photocurable component affects the hardness of the photocurable resin layers. Samples of the metal sheet with a photocurable resin layer laminated thereon were prepared in the same way as in Example 1, except that the photocurable resin composition was prepared according to the formulation shown in Table 3. They were bent and irradiated with light in the same way as in Example 1 to evaluate their working properties. The results are shown in Table 4. Incidentally, the ratio (%) of the photocurable component shown in Tables 3 and 4 is a value obtained by dividing the amount of the organic compounds in the photocurable resin layer (or the total amount of urethane acrylate and polyfunctional acrylate) by the total amount of urethane acrylate, polyfunctional acrylate, photopolymerization initiator, and methyl methacrylate, and multiplying the quotient by 100.

TABLE 3

| | Example No. | | | | |
|---|---|---|---|---|---|
| | 12 | 13 | 14 | 15 | 16 |
| Urethane acrylate (NK Oligo UA-32P) (parts) | 20 | 50 | 75 | 85 | 90 |
| Polyfunctional acrylate (Kayarad DPHA) (parts) | 80 | 50 | 25 | 15 | 10 |
| Photopolymerization initiator (Irgacure 184) (parts) | 2.5 | 2.5 | 2.5 | 2.5 | 2.5 |
| PMMA (parts) | 122 | 54 | 33 | 17 | 0 |
| Ratio of photocurable component (parts) | 44.5 | 63.9 | 73.8 | 83.7 | 97.6 |

TABLE 4

| Example | Ratio (%) of photo-curable component | Working properties | | | Pencil hardness |
|---|---|---|---|---|---|
| | | Immediately after working | Some time after working | After photo-curing | |
| 12 | 44.5 | ○ | ○ | ⊙ | F~H |
| 13 | 63.9 | ○ | ⊙ | ⊙ | H |

TABLE 4-continued

| Example | Ratio (%) of photo-curable component | Working properties | | | Pencil hardness |
|---|---|---|---|---|---|
| | | Immediately after working | Some time after working | After photo-curing | |
| 14 | 73.8 | ○ | ⊚ | ⊚ | 2 H |
| 15 | 83.7 | ○ | ⊚ | ⊚ | 2 H |
| 16 | 97.6 | ○ | ⊚ | ⊚ | 2 H |

It is noted that the coating film increases in hardness with the increasing amount of photocurable component; however, the hardness does not exceed 2H even though the ratio of photocurable component exceeds 73.8%.

EXAMPLE 17

A sample of the metal sheet with a photocurable resin layer laminated thereon was prepared in the same way as in Example 1, except that the photocurable resin composition was prepared from 100 parts of urethane acrylate "NK Oligo UA-32P", 12 parts of polyfunctional acrylate "Kayarad DPHA", 2.5 parts of photopolymerization initiator "Irgacure 184", 4 parts of ethanol, 10 parts of silicone alkyd varnish "TSR180" with 50% solids, from GE Toshiba Silicone Co., Ltd., 0.5 parts of leveling agent "BYK-534" from BicChemie Japan Inc.), and 50 parts of glass fiber "Surfestrand REV6" from Nippon Sheet Glass Co., Ltd. It was bent and irradiated with light in the same way as in Example 1 to evaluate its working properties.

The resulting sample was good in working properties and gave a pencil hardness of 4 H. It proved to have good stain resistance by the fact that a line (10 cm long) drawn on it with a marker (black, red, and blue) for the whiteboard was completely erased as an eraser for the whiteboard was passed over it twice back and forth.

INDUSTRIAL APPLICABILITY

According to the present invention, the metal sheet with a photocurable resin layer laminated thereon which is formed from a photocurable resin composition can be worked freely owing to the photocurable resin layer having a specific viscosity. Upon irradiation with light after working, the metal sheet yields a metal part with a high-hardness protective coating laminated thereon because the photocurable resin layer is three-dimensionally cured. The metal part can be readily obtained by irradiation with light for a short period of time after working on the metal sheet with the photocurable resin layer laminated thereon. This contributes to good working properties and cost reduction.

The metal part with a high-hardness protective coating laminated thereon will be suitable for use in various areas including electric appliances, OA machines, automobiles, and building materials.

What is claimed is:

1. A photocurable resin composition which contains a photocurable component and forms on a substrate a photocurable resin layer having a viscosity of 5000–500,000 Pa·s at 23° C. and 65% RH, wherein the photocurable component has a weight equivalent of polymerizable double bonds of 145–210, and wherein the photocurable component comprises (1) at least one prepolymer or oligomer selected from the group consisting of epoxy (meth)acrylate, urethane (meth)acrylate, polyester (meth)acrylate, alkyd resin (meth)acrylate, and silicone resin (meth)acrylate, and (2) at least one polyfunctional (meth)acrylate monomer having two or more (meth)acryloyl groups in one molecule.

2. The photocurable resin composition as defined in claim 1, wherein the photocurable component accounts for more than 50 mass % of organic compounds contained in the photocurable resin composition.

3. The photocurable resin composition as defined in claim 1, wherein the photocurable component is a mixture comprising at least one urethane (meth)acrylate and at least said one polyfunctional (meth)acrylate.

4. The photocurable resin composition as defined in claim 1, which contains a filler having shape-anisotropy.

5. The photocurable resin composition as defined in claim 4, wherein the filler is a glass fiber or a thin filmy glass.

6. The photocurable resin composition as defined in claim 5, wherein the glass fiber has a fiber diameter of 5–20 μm and an aspect ratio of 2–10, and the thin filmy glass has an average thickness more than 10 μm and an average grain size smaller than 50 μm.

7. The photocurable resin composition as defined in claim 1, which further contains an alkyd-modified silicone resin and/or acrylic-modified silicone resin, wherein the alkyd-modified silicone resin is represented by the following formula, in which R, R' and R" each denotes an organic group:

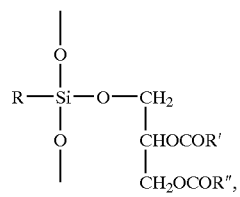

and wherein the acrylic-modified silicone resin is represented by the following formula, in which R and R' each denotes an organic group:

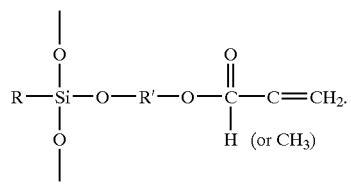

part with a high-hardness protective coating laminated thereon upon irradiation with light or electron beams after working.

8. The photocurable resin composition as defined in claim 1, wherein the weight equivalent of polymerizable double bonds is from about 155 to 200.

* * * * *

UNITED STATES PATENT AND TRADEMARK OFFICE
CERTIFICATE OF CORRECTION

PATENT NO.   : 6,927,243 B2
DATED        : August 9, 2005
INVENTOR(S)  : Takeshi Watase et al.

It is certified that error appears in the above-identified patent and that said Letters Patent is hereby corrected as shown below:

<u>Title page,</u>
Item [73], Assignee, should read:
-- Kabushiki Kaisha Kobe Seiko Sho (Kobe Steel, Ltd.), Kobe (JP) --.

Signed and Sealed this

Thirteenth Day of December, 2005

JON W. DUDAS
*Director of the United States Patent and Trademark Office*